(12) United States Patent
Maness

(10) Patent No.: US 11,105,393 B1
(45) Date of Patent: Aug. 31, 2021

(54) QUAD LOCK RELEASE DEVICE

(71) Applicant: Lifesaving Systems Corporation, Apollo Beach, FL (US)

(72) Inventor: Samuel Gene Maness, Apollo Beach, FL (US)

(73) Assignee: Lifesaving Systems Corporation, Apollo Beach, FL (US)

(*) Notice: Subject to any disclaimer, the term of this patent is extended or adjusted under 35 U.S.C. 154(b) by 0 days.

(21) Appl. No.: 17/004,843

(22) Filed: Aug. 27, 2020

Related U.S. Application Data

(63) Continuation of application No. 16/424,586, filed on May 29, 2019, now Pat. No. 10,844,932.

(60) Provisional application No. 62/677,279, filed on May 29, 2018.

(51) Int. Cl.
*F16G 11/10* (2006.01)

(52) U.S. Cl.
CPC ................... *F16G 11/10* (2013.01)

(58) Field of Classification Search
CPC .............. F16G 11/10; B64C 27/04; B64D 1/12; Y10T 24/45775; Y10T 24/45785; Y10T 24/45628; Y10T 24/45723; Y10T 24/45728; Y10T 24/45524; Y10T 24/45529; A44B 11/263; A44B 11/266

See application file for complete search history.

(56) References Cited

U.S. PATENT DOCUMENTS

| | | | | | |
|---|---|---|---|---|---|
| 3,345,710 | A | * | 10/1967 | Bush | F16G 11/10 24/573.11 |
| 3,413,692 | A | * | 12/1968 | Pressley | F16G 11/10 24/602 |
| 3,422,502 | A | * | 1/1969 | McCarthy | F16G 11/10 403/325 |
| 4,644,617 | A | * | 2/1987 | Tupper | B63H 9/10 24/114.5 |
| 4,803,760 | A | * | 2/1989 | Gelula | B63H 9/10 24/631 |
| 5,144,725 | A | * | 9/1992 | Krauss | A44B 11/266 24/616 |
| 5,383,257 | A | * | 1/1995 | Krauss | A44B 11/266 24/616 |
| 5,548,879 | A | * | 8/1996 | Wu | A44B 11/263 24/616 |
| 5,826,309 | A | * | 10/1998 | Tsamas | A44C 5/2052 24/68 J |

(Continued)

*Primary Examiner* — Robert Sandy
*Assistant Examiner* — Louis A Mercado
(74) *Attorney, Agent, or Firm* — Nicholas Pfeifer; Smith & Hopen, P. A.

(57) ABSTRACT

A quick release device having four release mechanisms and two levels of safety. The device includes a locking cover secured overtop a tumbler release mechanism. The locking cover includes two latches in opposing relation that are circumferentially guarded and require simultaneous actuation to unlock the cover. The cover can be translated about the main body of the device to reveal the tumbler release mechanism. The tumbler release mechanism requires simultaneous actuation of opposing release pins to release a tumbler carrying a load. Upon release, the tumbler falls from the quick release device. The two levels of safety that each require simultaneous actuation of their respective release actuators all but eliminate the possibility of accidental release of the load from the device.

20 Claims, 6 Drawing Sheets

(56) References Cited

U.S. PATENT DOCUMENTS

| | | | |
|---|---|---|---|
| 6,349,614 B1 * | 2/2002 | Matsuo | F16C 1/101 74/501.5 R |
| 10,383,409 B2 * | 8/2019 | Fiedler | A44B 11/25 |
| 10,669,129 B2 * | 6/2020 | Maness | B66C 1/36 |
| 2015/0182779 A1 * | 7/2015 | Dalebout | F16G 11/10 403/327 |

* cited by examiner

QUAD LOCK RELEASE DEVICE

CROSS-REFERENCE TO RELATED APPLICATIONS

This nonprovisional application claims priority to nonprovisional application Ser. No. 16/424,586, "QUAD LOCK RELEASE DEVICE," filed May 29, 2019 by the same inventor, now U.S. Pat. No. 10,844,932, which claims priority to provisional application No. 62/677,279, entitled "QUAD LOCK RELEASE DEVICE," filed May 29, 2018 by the same inventor.

BACKGROUND OF THE INVENTION

1. Field of the Invention

This invention relates, generally, to quick release devices. More specifically, it relates to a novel quick release device that can be used in helicopter hoisting operations.

2. Brief Description of the Prior Art

In the world of helicopter rescue, there is often a need in many operational instances to give the rescuer the ability to disconnect from the helicopter cable while the cable is under a load. This need can arise in many different situations. For example, a rescuer may need to disconnect from the helicopter if the helicopter is having mechanical or stability issues, or if the rescue line or rescuer becomes snagged or entangled on parts of a ship or a tree or is being drug through a body of water. In each of these situations, the rescuer may need to disconnect from the rescue cable to avoid further life-threatening issues.

The first release device used in helicopter rescue was the Capewell Release, which was originally designed for use in military parachutes. The Capewell design is a two-action device: the cover is pulled down revealing a cable ring, which is then pulled to release the load, i.e. release the parachute canopy. Should a soldier land in heavy winds and be unable to deflate his canopy, the Capewell Release allows the soldier to disconnect from the canopy to avoid any serious injury.

When the U.S. Navy—the first military operators to lower rescuers via helicopter—needed a quick release device, they adopted the Capewell device because they were familiar with the device and it was an approved piece of military hardware. The Capewell device, however, included a major safety flaw when used in helicopter hoisting operations. The cover of the Capewell device is easily opened if it becomes snagged, for example, on a tree. Parachutes only descend, so the chance of snagging open the cover of the Capewell in use for a paratrooper was all but nil. In helicopters, the rescuer equipped with the quick release is hoisted down and up. On numerous occasions over the life of the device in helicopter operations, the cover of the Capewell release has been opened, leaving rescuers just one short tug or snag away from falling to their deaths. Additionally, the Capewell cover is difficult to reset, requiring dexterity and concentration. Once released, the cover is off until the rescuer is either on the ground or hoisted back up into the helicopter.

Some integrators, like CMC Rescue, mounted the Capewell and used a Velcro-closed cover to handle the snagging problem, adding a third step to the quick release function. The modified device was safer but compromised the ability of the rescuer to quickly operator the release device.

For an extensive period, a purpose-built release device for helicopter rescue that was capable of releasing under a load and providing a safe and fast release was unavailable. The first purpose-built release device for helicopter rescue operations adapted to release under a load was the LiteFlite Quick Release Box (QRB). The QRB is operated by twisting the cover clockwise, then depressing the cover. There are several drawbacks to the QRB:
1. The pressure required to release the load changes significantly based on the weight of the load and is limited to 150 Kilograms, a force above which the device will not release the load.
2. Many users complain that the box must be against the wearers body to provide a stop for the back of the device, which is rarely possible in practical application.
3. The device can only be used in one direction—it has a front and back side.
4. The cover must be held and twisted on one side of the box to unlock.
5. The maintenance is significant and includes complete disassembly and lubrication annually to avoid corrosion.

Currently, there are no devices on the market that meet the real-world requirements of a purpose built quick release device for human external cargo (HEC) operations, that include:
1. An ability to release under a range of loads, up to 300 kilograms.
2. A two-stage operation, with two locking features to secure the load.
3. A specific design to avoid inadvertent actuation or snagging of the first locking feature.
4. A specific design to avoid inadvertent actuation or snagging of the final locking feature.
5. Single-handed actuation from either direction and front to back symmetry.
6. Operability regardless of the direction of pull.
7. A construction of non-corroding material to withstand the maritime environment with little to no maintenance.

Accordingly, what is needed is an improved quick release device. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved quick release device for HEC operations is now met by a new, useful, and nonobvious invention.

The novel structure includes a main body having a first attachment point and a tumbler having a second attachment point. The tumbler is releasably secured to the main body. A first tumbler release actuator and a second tumbler release actuator are adapted to release the tumbler from the main body when the first tumbler release actuator and the second tumbler release actuator are actuated. The device further includes a cover having a first locked position and a second unlocked position. In the first locked position, the cover covers at least a portion of the first tumbler release actuator and at least a portion of the second tumbler release actuator, thereby preventing actuation of the first and second tumbler release actuators. In the second position the first tumbler release actuator and the second tumbler release actuator are exposed and thus actuatable by a user.

The cover includes a first cover release actuator and a second cover release actuator. The cover can be moved from the first position to the second position when both the first and second cover release actuators are actuated. The tumbler is released from the main body when the cover is in the second position and the first and second tumbler release actuators are actuated.

In an embodiment, the first cover release actuator is located on the cover at a location that is opposite to a location of the second cover release actuator. In an embodiment, the first tumbler release actuator is located on the main body at a location that is opposite to a location of the second tumbler release actuator.

In an embodiment, each of the first and the second cover release actuators are adapted to be compressed in a first plane. In addition, each of the first and second tumbler release actuators are adapted to be compressed in a second plane that is not coplanar with the first plane.

An embodiment includes a circumferential guard surrounding each of the first and second cover release actuators. An embodiment includes a first concave depression in the cover in which the first cover release actuator resides and a second concave depression in the cover in which the second cover release actuator resides.

In an embodiment, the release of the tumbler requires simultaneous actuation of the first and second tumbler release actuators. In an embodiment, the cover requires simultaneous actuation of the first and second cover release actuators.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
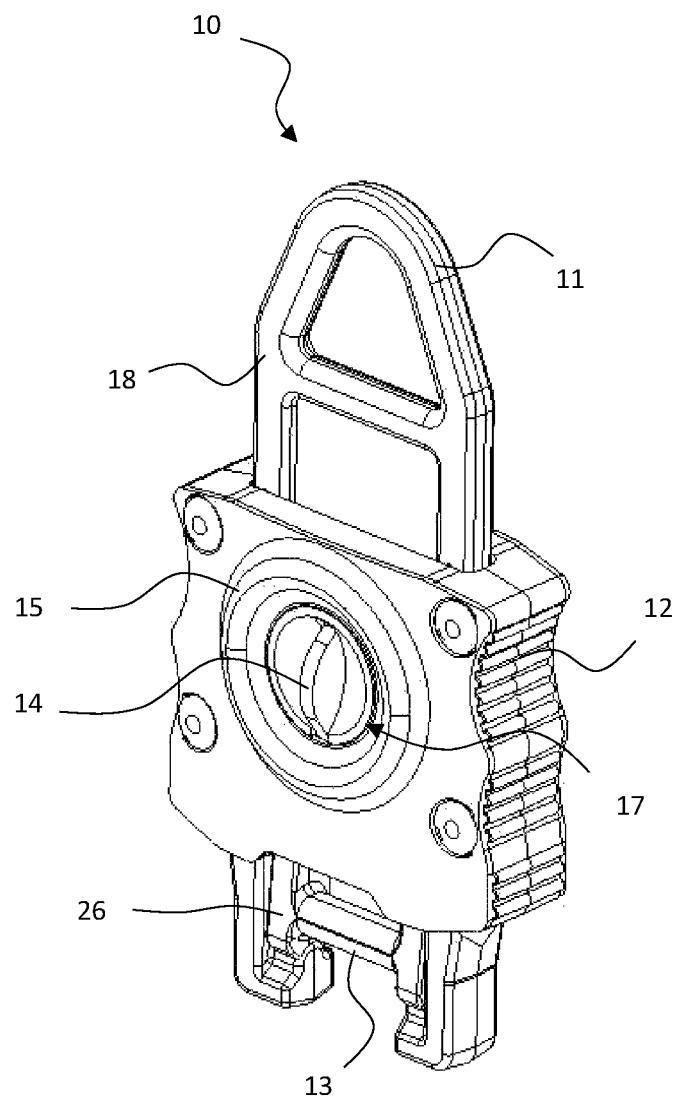
FIG. 1 is a front perspective view of the present invention in the locked position.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

Those who work in helicopter search and rescue are often required to have a means by which they can disconnect from hoisting or restraining devices while under a load. The present invention is an improvement to quick release devices that allow rescuers to easily and quickly release themselves from the helicopter, while also eliminating the possibility of the quick release device from being inadvertently actuated. While this application specifically refers to quick release devices for helicopters, a person of ordinary skill in the art would recognize that the quick release device could be used in other situations.

An embodiment of the present invention is depicted in FIGS. 1-6. As depicted, quick release device 10 includes upper attachment point 11 on main body 18 and lower attachment point 13 on tumbler 26. Upper attachment point 11 is intended to provide a point on which a hook or rope/cable can be secured and lower attachment point 13 provides the same. The quick release device resides between the personnel being hoisted (i.e. the load) and the hoisting device (e.g. a helicopter). Both upper and lower attachment points 11, 13 are depicted in specific shapes, but those shapes can vary without departing from the scope of this invention.

Quick release device 10 further includes locking cover 12 having a pair of cover release actuators, jointly denoted by reference numeral 14. Cover release actuators 14 are exemplarily depicted as latches; however, an embodiment could use any actuator known to a person of ordinary skill in the art. An embodiment includes each cover release actuator 14 disposed on an opposite side of locking cover 12 in first plane 50 (see FIG. 3). As depicted, cover release actuators 14 are disposed on a front surface of locking cover 12 and on a rear surface of locking cover 12. However, an embodiment may include the cover release actuators 14 disposed on the lateral sides or the top and bottom surfaces of cover 12 rather than the front and rear surfaces. The oppositely arranged configuration of cover release actuators 14 aids in preventing unintentional actuation of both cover release actuators 14.

Figure 2:
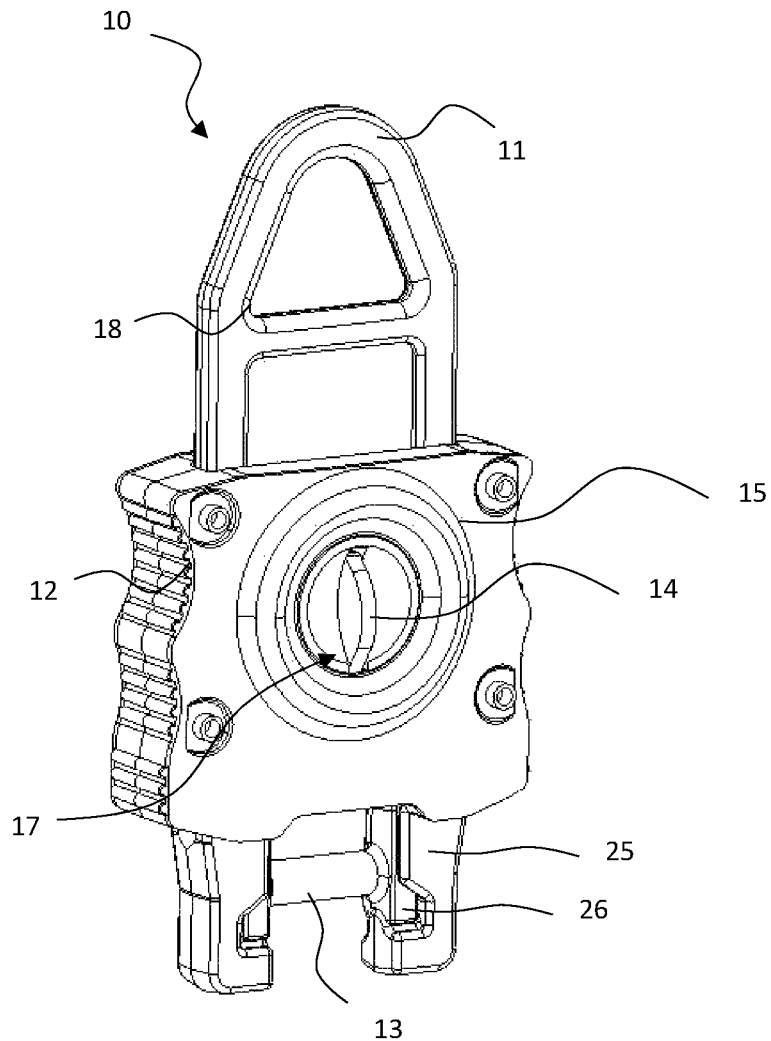
FIG. 2 is a rear perspective view of FIG. 1.
Figure 3:
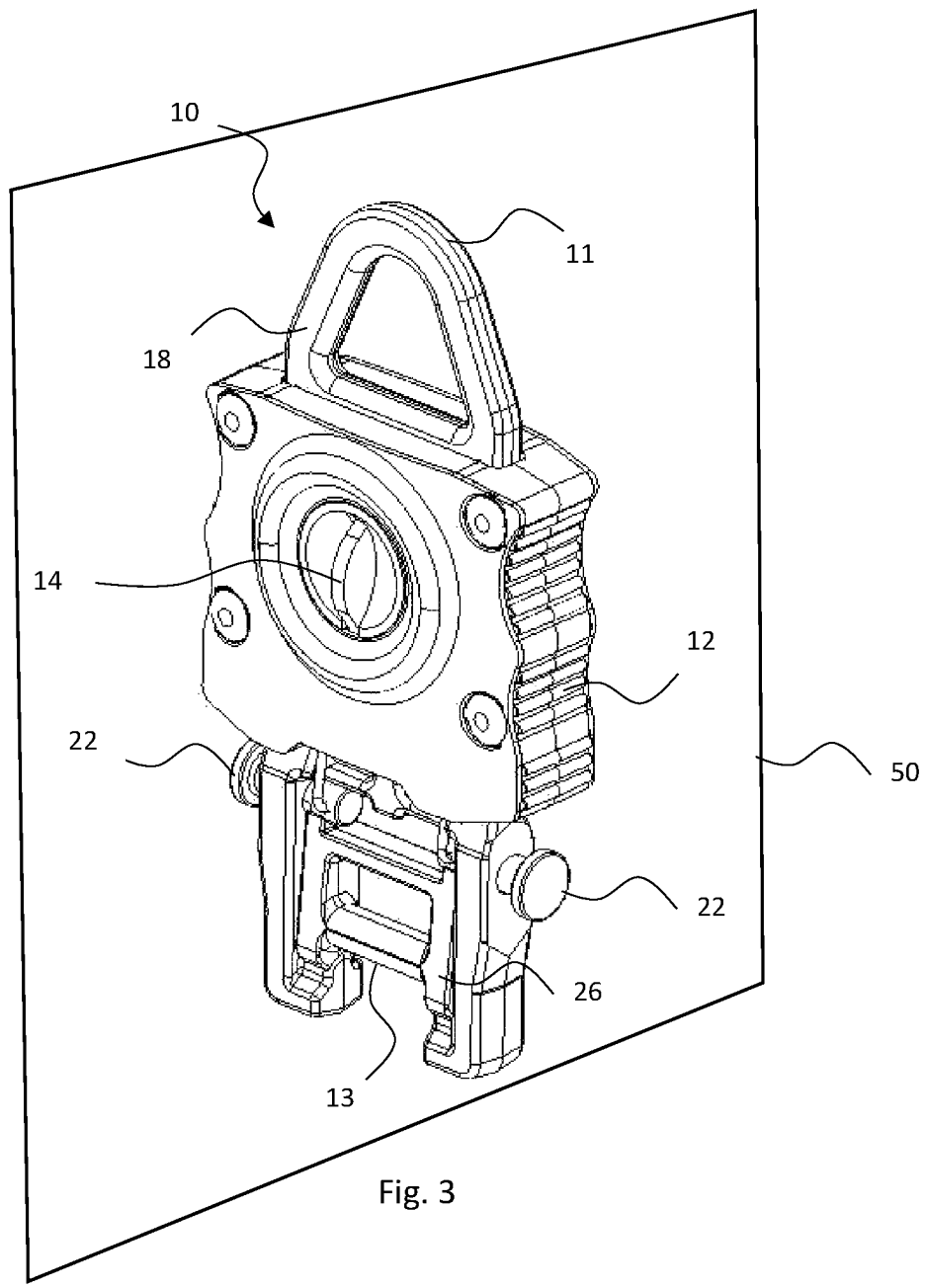
FIG. 3 is a front perspective view of the locking cover in the unlocked position.

An embodiment requires the actuation of both cover release actuators 14 to release cover 12 and allow cover 12 to transition between a locked position (see FIGS. 1-2) and an unlocked position (see FIG. 3). Preferably, both cover release actuators 14 must be simultaneously actuated to enable the transition of cover 12 between a locked position and an unlocked position. The simultaneous actuation of both cover release actuators 14 aids in preventing unintentional transition of cover 12 between a locked position and an unlocked position.

In an embodiment, unlike the Capewell Riser Release, locking cover 12 of the present invention can be easily reset into the safe locked position, even during hoisting, by simply translating locking cover 12 in the opposite direction back to its locked position. In this embodiment, actuation of cover release actuators 14 is not required when transitioning from an unlocked position to a locked position, which ensures that the cover can be reset quickly as needed.

Cover release actuators, which are exemplarily depicted as latches 14, protrude through locking cover 12 and are surrounded by raised circumferential guards 15. Latches 14 preferably do not extend outwardly past the outward extension of circumferential guards 15. As such, latches 14 are fully/concentrically guarded from inadvertent actuation. Effectively, locking cover 12 can only be released through dual actuation of latches 14 by a human hand. This design, previously unseen in helicopter rescue equipment, provides the greatest possible protection against snags, bumps, or other accidental unlocking of the locking cover of the device.

In an embodiment, cover 12 includes depressions 17 extending inwardly within the circumference of circumferential guards 15. Latches 14 protrude through depressions 17. An embodiment may rely on either circumferential guards or depressions (with the cover acting as a guard) to protect the latches from accidental actuation. Regardless of whether the embodiment employs raised circumferential guards or a depression into the cover, the latches preferably do not extend beyond the guards or covers, respectively such that a specific degree of precision is required to depress the latches.

As will be explained further below, latches 14 must be actuated to translate locking cover 12, which is the first step in completing the release procedure. There is some degree of depression of latches 14 that does not release cover 12, which will become apparent in subsequent portions of this disclosure. In an embodiment, the extent of depression to release cover 12 includes latches 17 being completely depressed. In other embodiments, the degree of compression requires that the latch be decompressed within the depression or below the extent to which the circumferential guards extend outwardly.

An embodiment of the present invention further removes the possibility of unintentional unlocking, i.e. translation, of locking cover 12, by release latches 14 being located in a different plane of actuation in comparison to tumbler release actuators 22. Once cover 12 is unlocked and translated up and away from tumbler 26, as depicted in FIG. 3, tumbler release actuators 22 are exposed. An embodiment includes tumbler release actuators 22 being perpendicularly oriented with respect to latches 14 in locking cover 12, such that purposeful actuation from multiple directions is required to release tumbler 26. In an embodiment, tumbler release actuators 22 are oppositely located with respect to each other and require purposeful actuation towards each other in the same second plane 55 (see FIG. 5) in order to release tumbler 26. In addition, release buttons 16 preferably must be depressed simultaneously—in opposing directions—to release tumbler 26.

Figure 4:
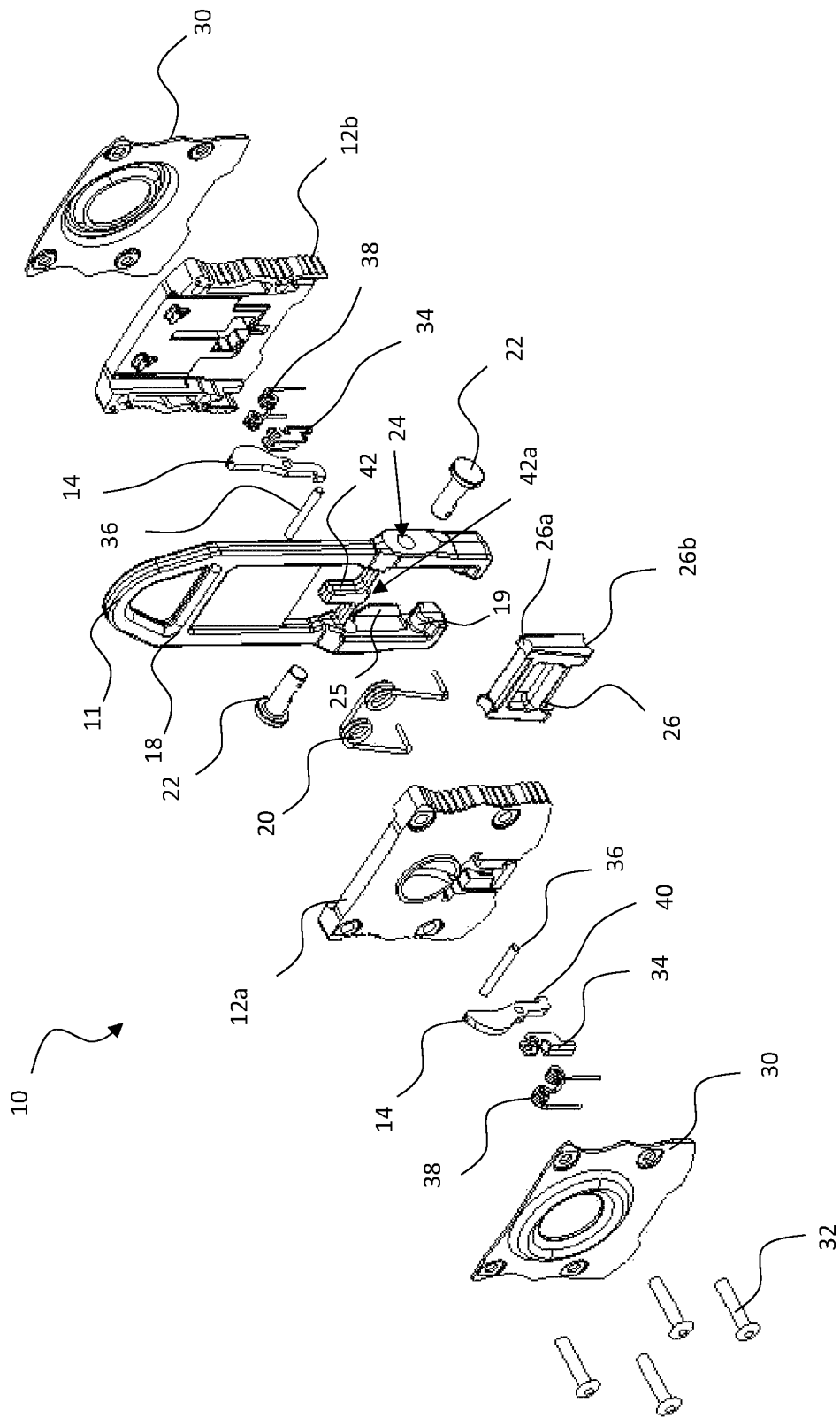
FIG. 4 is an exploded view of the present invention.

Referring now to FIG. 4, the final release mechanism is guarded by locking cover 12, which is a dual cover made up of the inserts 12a, 12b and outer covers 30, riveted together by four cover rivets 32. Inserts 28 partially house the opposing, spring-tensioned, self-locking actuators 14, latch saddles 34, pins 36, and latch springs 38. Each spring-loaded release latch 14 rests on latch saddle 34. Latch springs 38 force latches 14 to pivot about latch pin 36 into a position of repose. Latch 14 and saddle 34 pivot about pin 36 when latch 14 is compressed into depression 17. Compressing latch 14 pivots lower flange 40 out of contact with lower end 42a of latch contact 42 in main body 18. As a result, locking cover 12 is unlocked and can be slid up towards the upper end 11 of main body 18 to reveal release actuators 22.

In an embodiment, upper end 42b of latch contact 42 is intended to prevent downward translation of locking cover 12 when latches 14 are not depressed. Should a user raise cover 12 and expose release actuators 22 inadvertently, the cover 12 can be reset safely over release actuators 22 by depressing the cover latches 14 and sliding the cover 12 back down the main body 18 until it comes to rest on a mechanical stop.

An embodiment, however, may include latch contact 42 having a longitudinal extent that extends beyond the vertical distance that latches 14 travel when moved into the unlocked position, thereby ensuring that latches 14 will not reside upper end 42b of latch contact 42 above and prevent cover 12 from being translated back into a locked position without first actuating latches 14. An embodiment may also include latches 14 having a rounded bottom ends and/or upper end 42b having a round shape to allow the latches to automatically slide around upper end 42b when cover 12 is forced downwards from the unlocked position to the locked position.

Figure 5:
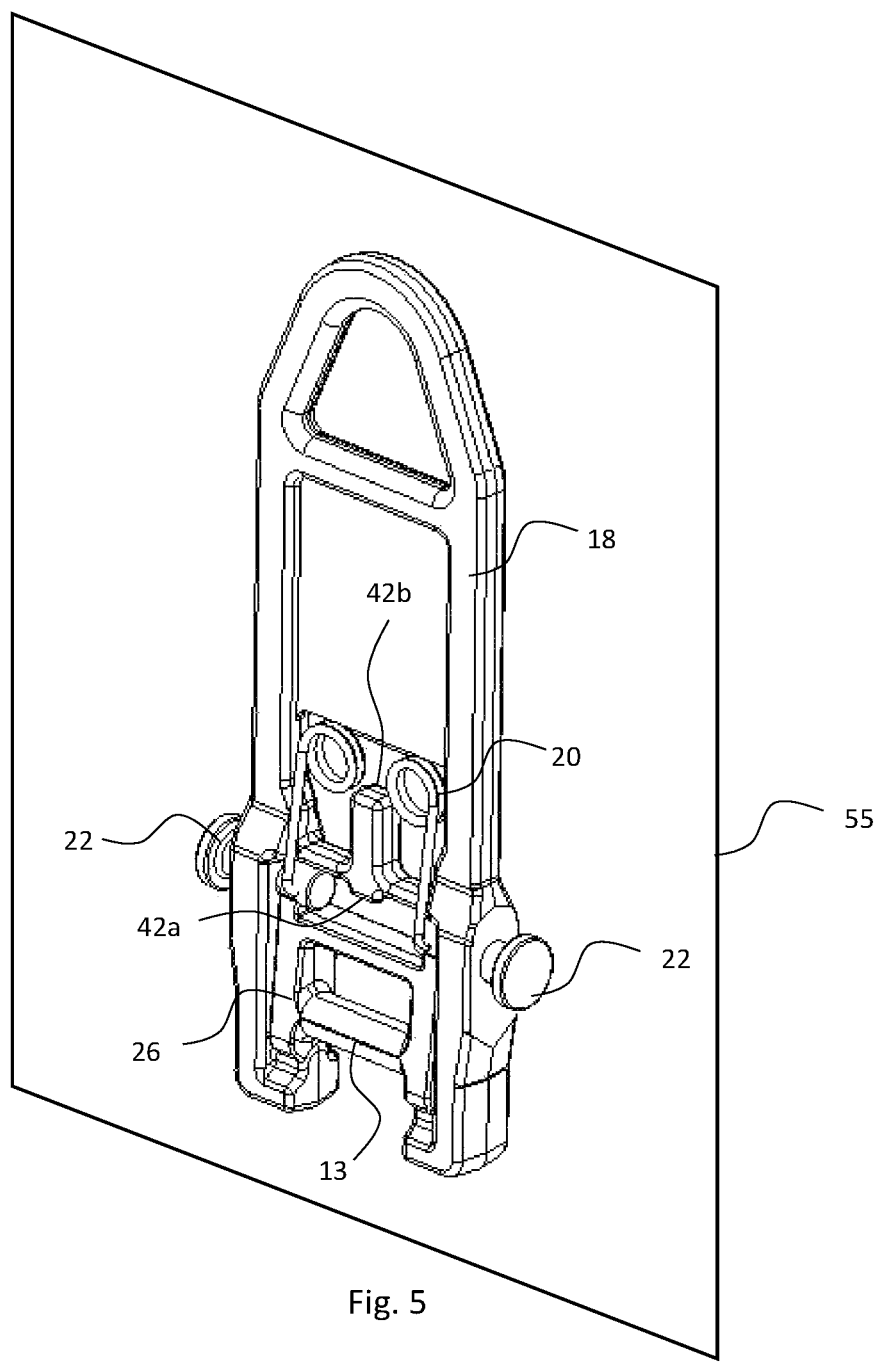
FIG. 5 is a front perspective view of the present invention with the cover removed.
Figure 6:
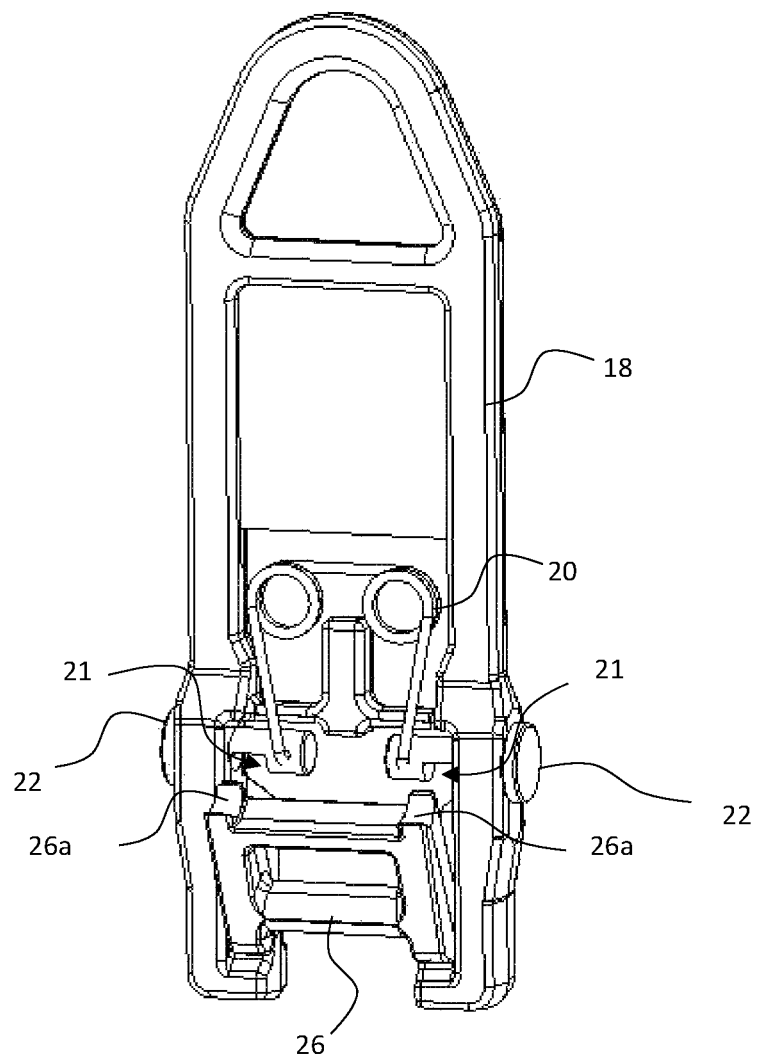
FIG. 6 is a front perspective view depicting the tumbler after it has been released from the main body and has begun rotating away from the main body under the force of a load.

Referring now to FIGS. 4-6, main body 18 of the device houses release springs 20 and receives release actuators 22, which pass through apertures 24 in main body 18. Release springs 20 provide a biasing force to hold release actuators 22 in the locked position as depicted in FIGS. 3 and 5. As shown in FIGS. 3 and 5-6, release actuators 22 engage release springs 20. It is considered that any type of connection known to a person of ordinary skill in the art may be used to place springs 20 and release actuators 22 into mechanical communication.

Release actuators 22 hold release tumbler 26 in a secured position when release actuators 22 are in their locked position. As best depicted in FIGS. 4 and 6, upper end of tumbler 26 includes two semi-circular pedestals 26a that mate with release pins 22. Likewise, the bottom end of release tumbler 26 includes two semi-circular pedestals 26b that rest on rounded lower shelf 19 of main body 18. In an embodiment, lower shelf 19 is curved to ensure that release tumbler 26 rotates out of vertical alignment with main body 18 when subject to a load and released by release actuators 22. In an embodiment, tumbler 26 includes a center of gravity that is offset towards a particular half of tumbler 26 to ensure that tumbler 26 falls in the direction to which the center of gravity is offset. An embodiment may also include a specific curvature on either semi-circular pedestals 26b or lower shelf 19 to cause tumbler 26 to rotate in a specific direction when released.

Release actuators 22 include release notches 21 through which the semicircular pedestals 26a on the upper end of release tumbler 26 may pass. Release notches 21 are position along the length of release actuators 22 at a predetermined location. The predetermined location is positioned such that upper pedestals 26a are out of lateral alignment with release notches 21 when release actuators 22 are in the locked position. When release actuators 22 are forced into a release position (inwards towards each other as shown in FIG. 6) release notches 21 move into lateral alignment with upper pedestals 26a and the load causes release tumbler 26 to rotate out of vertical alignment with main body 18 and freely fall away from the device.

As best shown in FIGS. 2 and 4, an embodiment includes back stops 25 that prevent tumbler 26 from rotating towards the back of main housing 18. Back stops 25 help ensure that the tumbler and attached load fall from the quick release device in a predetermined direction. Back stops 25 may be any structural stop to prevent tumbler 26 from rotating towards a predetermined side of quick release device 10.

In an embodiment, both the cover release actuators and the tumbler release actuators can be any actuator known to a person of ordinary skill in the art. An embodiment may use rotatable cover release actuators and/or rotatable tumbler release actuators, rather than depressible actuators. An embodiment may also use a button-type actuator for the cover release actuator rather than a latch-type actuator.

The device is preferably made from materials that can withstand heavy loads and harsh environmental factors. Some preferred material choices are provided below. Both the main body and tumbler are preferably forged from 17-4 stainless steel and then machined to create the necessary details for proper operation. The metal covers are preferably either machined or formed by cutting and stamping methods. The latch brackets are preferably stamped and formed stainless steel. The release pins are preferably machined from stainless steel as are the latch pins. The cover latches are preferably laser cut or stamped from stainless steel. The inserts are preferably either 3D printed or injection molded from a variety of plastics, glass-filled nylon being preferred. The cover rivets, latch springs, and the release springs are preferably procured from available commercial sources, manufactured to specification. The tumbler may be affixed to sufficiently strong webbing or other materials that suspend or take a load. The parts are assembled, and the device is preferably held as a single unit by four cover rivets.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A quick release device, comprising:
   a main body having a first attachment point;
   a tumbler having a second attachment point;
   the tumbler releasably secured to the main body;
   a first tumbler release actuator and a second tumbler release actuator adapted to release the tumbler from the main body when the first tumbler release actuator and the second tumbler release actuator are actuated;
   a cover having:
      a first position covering at least a portion of the first tumbler release actuator and at least a portion of the second tumbler release actuator;
      a second position in which the first tumbler release actuator and the second tumbler release actuator are exposed;
      a first cover release actuator and a second cover release actuator, wherein the first cover release actuator and the second cover release actuator are separate components that are independently actuatable;
      wherein the cover can be moved from the first position to the second position when both the first and second cover release actuators are independently actuated;
   whereby the tumbler can be released from the main body when the cover is in the second position and the first and second tumbler release actuators are actuated.

2. The quick release device of claim 1, further including the first cover release actuator located on the cover at a location that is opposite to a location of the second cover release actuator.

3. The quick release device of claim 1, further including the first tumbler release actuator located on the main body at a location that is opposite to a location of the second tumbler release actuator.

4. The quick release device of claim 1, further including:
   each of the first cover release actuator and the second cover release actuator adapted to be compressed in a first plane;
   each of the first tumbler release actuator and the second tumbler release actuator adapted to be compressed in a second plane; and
   wherein the first plane and the second plane are not coplanar.

5. The quick release device of claim 1, further including a circumferential guard surrounding each of the first cover release actuator and the second cover release actuator.

6. The quick release device of claim 1, further including a first concave depression in the cover in which the first cover release actuator resides and a second concave depression in the cover in which the second cover release actuator resides.

7. The quick release device of claim 1, wherein the release of the tumbler requires simultaneously actuating of the first and second tumbler release actuators.

8. The quick release device of claim 1, wherein movement of the cover from the first position to the second position requires simultaneously actuating of the first and second cover release actuators.

9. A quick release device, comprising:
   a main body having a first attachment point;
   a tumbler having a second attachment point;
   the tumbler releasably secured to the main body;
   a first tumbler release actuator and a second tumbler release actuator adapted to release the tumbler from the main body when the first tumbler release actuator and the second tumbler release actuator are actuated;
   a cover having:
      a first position covering at least a portion of the first tumbler release actuator and at least a portion of the second tumbler release actuator;
      a second position in which the first tumbler release actuator and the second tumbler release actuator are exposed;
      a first cover release actuator and a second cover release actuator, wherein the cover can be moved from the first position to the second position when both the first and second cover release actuators are actuated;

whereby the tumbler cannot be released from the main body when the cover is in the first position.

10. The quick release device of claim 9, further including the first cover release actuator located on the cover at a location that is opposite to a location of the second cover release actuator.

11. The quick release device of claim 9, further including the first tumbler release actuator located on the main body at a location that is opposite to a location of the second tumbler release actuator.

12. The quick release device of claim 9, further including a circumferential guard surrounding each of the first cover release actuator and the second cover release actuator.

13. The quick release device of claim 9, further including:
- each of the first cover release actuator and the second cover release actuator adapted to be actuated in a first plane; and
- each of the first tumbler release actuator and the second tumbler release actuator adapted to be actuated in a second plane, wherein the second plane is not coplanar with the first plane.

14. The quick release device of claim 9, wherein the release of the tumbler requires simultaneously actuating the first and second tumbler release actuators.

15. The quick release device of claim 9, wherein movement of the cover from the first position to the second position requires simultaneously actuating of the first and second cover release actuators.

16. A quick release device, comprising:
- a main body having a first attachment point;
- a tumbler having a second attachment point;
- the tumbler releasably secured to the main body;
- a first tumbler release actuator and a second tumbler release actuator, wherein the first and second tumbler release actuators each have a locked position in which the tumbler cannot become detached from the main body;
- the first and second tumbler release actuators each having an unlocked position, wherein the tumbler is released from the main body when the first tumbler release actuator and the second tumbler release actuator are directly actuated by a user;
- a cover having:
  - a first position covering at least a portion of the first tumbler release actuator and at least a portion of the second tumbler release actuator, thereby preventing actuation of the first and second tumbler release actuators;
  - a second position in which the first tumbler release actuator and the second tumbler release actuator are exposed;
  - a first cover release actuator and a second cover release actuator, wherein the first and second cover release actuators each have a position of repose during which the first and second cover release actuators prevent the cover from moving from the first position to the second position;
- whereby the tumbler can be released from the main body when the cover is in the second position and the first and second tumbler release actuators are actuated.

17. The quick release device of claim 16, further including:
- each of the first cover release actuator and the second cover release actuator adapted to be compressed in a first plane;
- each of the first tumbler release actuator and the second tumbler release actuator adapted to be compressed in a second plane; and
- wherein the first plane and the second plane are not coplanar.

18. The quick release device of claim 16, further including a circumferential guard surrounding each of the first cover release actuator and the second cover release actuator.

19. The quick release device of claim 16, further including a first concave depression in the cover in which the first cover release actuator resides and a second concave depression in the cover in which the second cover release actuator resides.

20. The quick release device of claim 16, wherein the release of the tumbler requires simultaneous actuation of the first and second tumbler release actuators and movement of the cover from the first position to the second position requires simultaneous actuation of the first and second cover release actuators.

* * * * *